United States Patent [19]
Nishimura et al.

[11] Patent Number: 5,441,798
[45] Date of Patent: Aug. 15, 1995

[54] FILTER CLOTH FOR AIR BAGS

[75] Inventors: Kunio Nishimura; Shiro Kumakawa, both of Ibaraki; Hideo Nakagawa, Takatsuki, all of Japan

[73] Assignee: Teijin Limited, Osaka, Japan

[21] Appl. No.: 331,619

[22] Filed: Nov. 1, 1994

[30] Foreign Application Priority Data

Mar. 3, 1993 [JP] Japan .................................. 5-042610

[51] Int. Cl.⁶ .............................................. D03D 3/00
[52] U.S. Cl. ................................ 428/229; 139/384 R; 139/387 R; 139/389; 139/426 TW; 280/728.1; 428/225; 428/257; 428/131
[58] Field of Search ....................... 280/743 R, 728 R; 428/225, 229, 257, 131; 139/384 R, 387 R, 389, 426 TW

[56] References Cited

U.S. PATENT DOCUMENTS

| | | | |
|---|---|---|---|
| 4,840,397 | 6/1989 | Katz et al. | 280/739 |
| 5,131,434 | 7/1992 | Kurmmheuer et al. | 139/35 |
| 5,236,775 | 8/1993 | Swoboda et al. | 428/225 |

FOREIGN PATENT DOCUMENTS

| | | |
|---|---|---|
| 0442373 | 8/1991 | European Pat. Off. . |
| 316853 | 1/1991 | Japan . |
| 4214437 | 8/1992 | Japan . |
| 4262938 | 9/1992 | Japan . |
| 4281038 | 10/1992 | Japan . |

*Primary Examiner*—James J. Bell
*Attorney, Agent, or Firm*—Burgess, Ryan and Wayne

[57] ABSTRACT

A filter cloth for air bags comprises a synthetic fiber woven fabric having (1) a ground weave structure segment having a single plain weave structure or a single twill weave structure and (2) a plurality of high gas-permeability weave structure segments substantially evenly distributed in the ground structure segment, exhibiting an air permeability higher than that of the ground structure segment and having (A) a mock leno weave structure having pinholes, (B) a double plain weave structure or (C) a double twill weave structure, and allows, when an air bag is formed from the cloth, a layout for cutting and a cutting of the cloth to be made freely and when the resultant air bag is inflated, the bag allows an inflation gas to instantly flow out from the bag so as to ensure the safety of the occupant.

24 Claims, 9 Drawing Sheets ary Unexamined Patent Publication (EP-A-)

FILTER CLOTH FOR AIR BAGS

TECHNICAL FIELD

The present invention relates to a filter cloth for air bags for automobiles and aircrafts. More particularly, the present invention relates to a filter cloth for air bags having a plurality of high gas-permeability structure segments substantially evenly distributed and formed in a high density ground structure segment. The air bag produced from the filter cloth allows, when a large amount of inflation is blown into the air bag, a portion of the inflation gas to instantly flow to the outside of the bag through the high gas-permeability structure segments, to thereby enhance the safety of an occupant of the vehicle, and enhances the resistance of the air bag to seam slippage.

BACKGROUND ART

The performance requirements for a filter cloth for air bags are as follows.

① The woven fabric, from which an air bag is formed, should have a relatively high gas permeability and, when an automobile or aircraft collides and an inflation gas is introduced into the air bag, the air bag can allow a portion of the inflation gas to substantially evenly flow out so as to lower the gas temperature, to thereby prevent burning of an occupant by the inflation gas introduced into the air bag.

② The filter cloth should appropriately filter a large mount of the fine particles contained in the inflation gas and maintain the air in the inside of the automobile or aircraft clean even after the inflation of the air bag.

③ After inflation, the air bag should be quickly deflated by discharging the inflation gas so as to not constrain the occupant.

As filter cloth for air bags meeting the above requirements, the following prior arts are been known. U.S. Pat. No. 4,840,397 for Katz et al. discloses an air bag device for a motorcar provided with a filter for cleaning an inflation gas. The filter is formed from a filter cloth which consists of a 2/1 twill weave made from aramid fiber spun yarns. This woven fabric has a single weaving structure and exhibits a high gas-permeability.

However, this filter cloth exhibits a poor resistance to seam slippage due to the single weaving structure having a high gas-permeability. Thus, when an inflation gas is blown into an air bag made from the filter cloth, the inflation gas can be discharged only through very small gaps formed between weaving yarns and distributed throughout the filter cloth. Accordingly, the filter cloth exhibits an unsatisfactory gas-discharging property and thus the air bag exhibits an unsatisfactory deflating property.

Japanese Unexamined Patent Publication No. 3-16,853 discloses a hollow weave fabric for air bags which is provided with specific gas-discharging segments having a mock leno weave structure.

However, in the air bag, since the mock leno weave structure is formed in vent hole portions (completely opening portions) specified in the hollow weave segment structure, the resultant air bag exhibits a poor deflating property after the introduction of the inflation gas. Also, since the mock leno weave structure is formed in specific portions of the woven fabric the air bag which can be produced from the woven fabric is limited to a specific type of air bags having a specific form.

European Unexamined Patent Publication (EP-A-) No. 442,373 (which corresponds to Japanese Unexamined Patent Publication No. 4-214,437) discloses a filter cloth consisting of a gas-discharging fabric. This filter cloth per se is a woven fabric having a single weave structure. Accordingly, this filter cloth has a poor resistance to seam slippage, similar to that of the filter cloth disclosed in the above-mentioned U.S. Patent. Also, when an inflation gas is blown into the air bag made from the filter cloth, the inflation gas can be discharged only through very small gaps formed between the weaving yarns and distributed throughout the air bag, and thus the air bag exhibits an unsatisfactory gas-discharging property and thus a poor deflating property.

Japanese Unexamined Patent Publication No. 4-262,938 discloses a filter cloth made from stretch-broken, fascinated yarns. However, this cloth consists of a woven fabric having a single weave structure similar to those disclosed in the above-mentioned prior arts and thus has the similar disadvantages to those mentioned above.

Finally, German Unexamined Patent Publication (DE-A-) No. 4126709 corresponding to U.S. Pat. No. 5,131,434 and to Japanese Unexamined Patent Publication No. 4-281,038 discloses a filter cloth having a plurality of segments different in weave structure and thus in gas permeability from each other. This cloth has weave structure segments having a high gas-permeability and thus a moderate filtering property, and other weave structure segments having a moderate or low gas-permeability and suitable for sewing. Namely, in this filter cloth, two or more segments different in function and in weave structure from each other are arranged in an appropriate layout for cutting of the cloth for the air bag.

According to the above-mentioned German patent publication specification, the segments having a high cutting property and a high sewing property for air bags are formed by a high density weave structure having a low gas-permeability and a high seam slippage resistance; other segments are formed by a moderate density weave structure having a moderate gas-permeability and still other segments having a high filtering property are formed by a low density weave structure having a high gas-permeability.

However, this type of filter cloth is disadvantageous in that the high cutting property, high sewing property segments are necessarily formed over both the high density weave structure portions and the moderate density weave structure portions and the moderate density weave structure portions exhibit a poor seam slippage resistance. Also this filter cloth has the commercial problem that since it is designed and woven in specific weaving structures suitable for an air bag of specific form and dimensions, the resultant filter cloth can be employed only for a specific type of air bag having a specific form and dimensions. The abovementioned German patent publication specification includes no description relating to the deflating property of the air bag after inflating.

Further, the high gas-permeability portions, which are so-called windows, formed in the filter cloth for an air bag, are woven in a 2/2 Panama weave structure to dimensions of a width of 40 cm and a length of 30 cm. Therefore, the window portions have a weave structure which exhibits a relatively high gas permeability compared to the ground plain weave structure. Namely, the window portions are not openings and thus must be formed over a relatively large area. The presence of the large area of the window portions (high gas-permeability portions) cause the freedom in trimming of the resultant filter cloth for cutting for the production of the air bag to be small.

DISCLOSURE OF THE INVENTION

An object of the present invention is to provide a filter cloth for air bags comprising a low gas-permeability ground weave structure segment and a plurality of high gas-permeability weave structure segments, and capable of being freely trimmed and cut into cloth pieces for forming the air bag without restrictions on the trimming and cutting due to the location of the high gas-permeability weave structure segments.

Another object of the present invention is to provide a filter cloth for air bags, which cloth exhibits an excellent seam slippage resistance in every portion thereof, although the filter cloth has a moderate gas-permeability.

Still another object of the present invention is to provide a filter cloth capable of forming an air bag having an excellent seam slippage resistance in every portion thereof in spite of its moderate gas-permeability, an excellent deflating property after the inflation is completed, and thus a high safety.

The filter cloth of the present invention for air bags comprises a woven fabric formed from synthetic fiber yarns and is characterized in that the woven fabric comprises (1) a ground weave structure segment having a single plain weave structure or a single twill weave structure; and (2) a plurality of high gas-permeability weave structure segments formed in the ground weave structure segment at a substantially constant distribution density, exhibiting a higher air permeability than that of the ground weave structure segment, and having:

(A) a mock leno weave structure having pinhole-like openings;
(B) a double plain weave structure; or
(C) a double twill weave structure.

BEST MODE OF CARRYING OUT THE INVENTION

The present invention will be explained in detail, with reference to the attached drawings.

(1) Constitution of the filter cloth for air bags.
① A filter cloth having a plurality of high gas-permeability mock leno weave structure segments distributed throughout the cloth and having pinhole-like openings:

The constitution and functions of the mock leno weave structure segments having pinhole-like openings formed in a weave structure will be explained by referring to FIG. 1.

Figure 1:
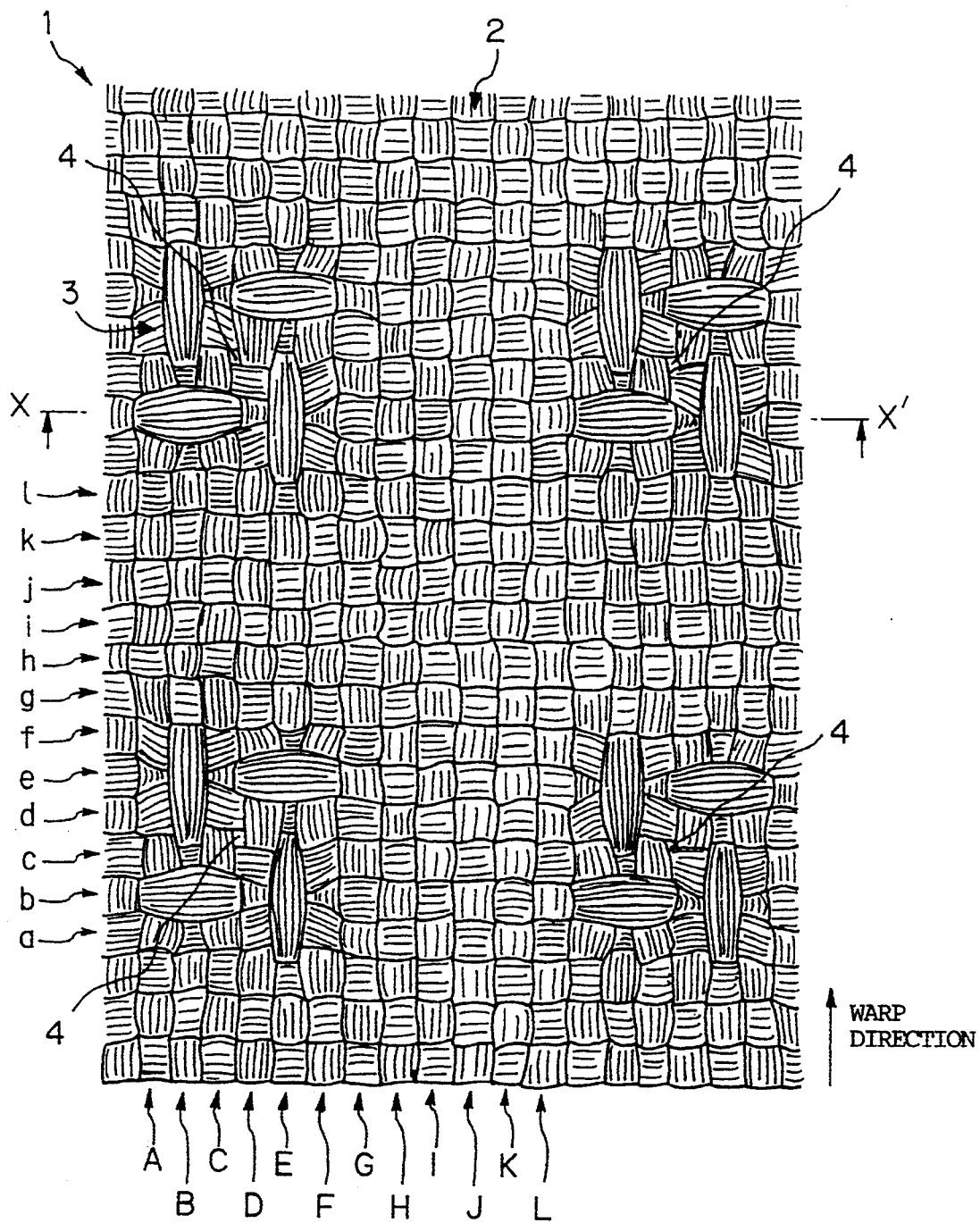
FIG. 1 is an explanatory plane view of a weave structure of an embodiment of the filter cloth of the present invention for air bags.
Figure 2:
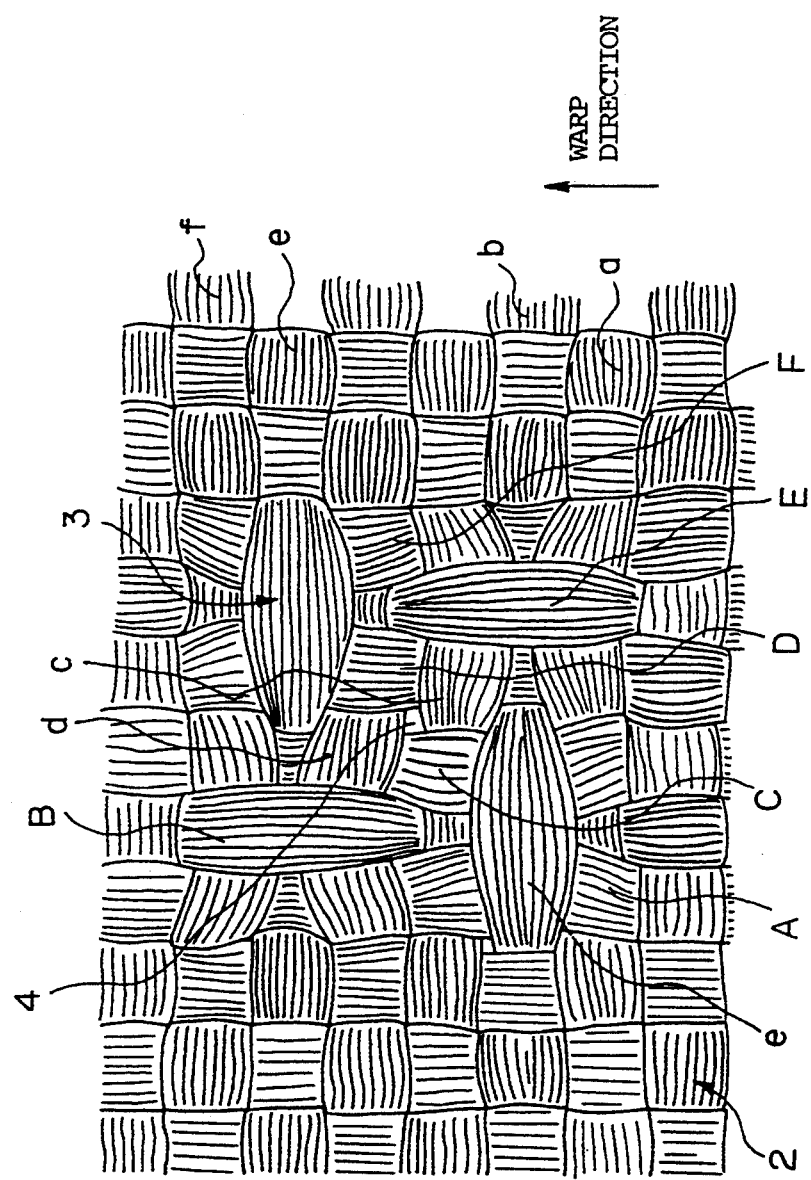
FIG. 2 is an enlarged explanatory plan view of a high gas-permeability mock leno weave structure segment involved in the weave structure of FIG. 1.
Figure 3:
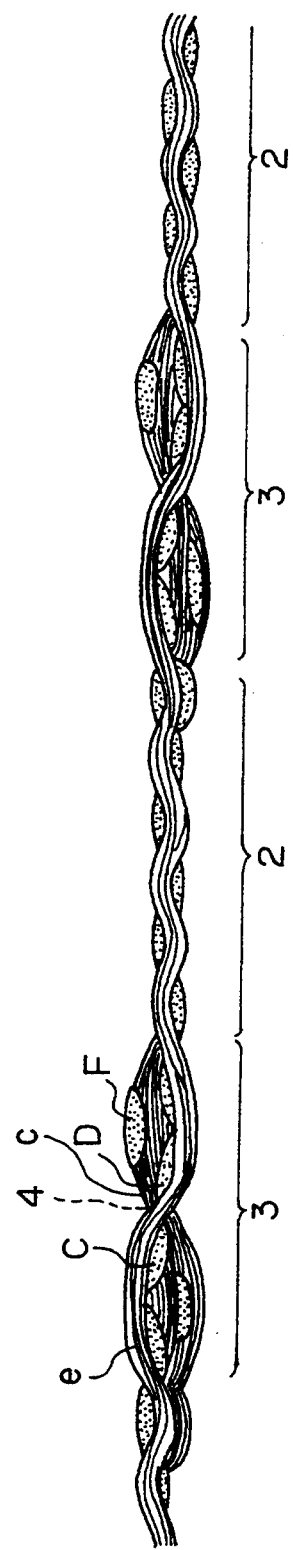
FIG. 3 an explanatory cross-sectional profile of the mock leno weave structure segment indicated in FIG. 1, along a line X—X'.

FIG. 1 shows a weave structure of a filter cloth composed of a ground weave structure segment having a single plain weave structure and high gas-permeability mock leno weave structure segments evenly distributed in the ground weave structure segment. This weave structure corresponds to that described in Example 5, which will be mentioned hereinafter. FIG. 2 is a partially enlarged view of the high gas-permeability mock leno weave structure segment of the filter cloth of FIG. 1, and FIG. 3 shows a cross-sectional profile of the filter cloth of FIG. 1, along the line X—X'. Referring to FIGS. 1, 2 and 3, a filter cloth 1 is composed on a ground plain weave structure segment 2 and a plurality of high gas-permeability weave structure segments 3 evenly distributed in the ground weave structure segment and having a mock leno weave structure.

The high gas-permeability mock leno weave structure segments 3 are composed of at least one mock leno weave structure unit. This mock leno weave structure unit is composed of six warp yarns A to F and six weft yarns a to f. The warp yarns A, C, D and F alternately appear on the front surface and on the back surface of the weave for every one weft yarn, in the same manner as in a plain weave structure. However, the warp yarns B and E alternately appear on the front surface and on the back surface of the weave for every three weft yarns, in each mock leno weave structure. These warp yarns B and E have a lower frequency in crossing with the weft yarns than that of the warp yarns A, C, D and F. Therefore, the warp yarns B and E are slightly raised outward from the front and back surfaces of the woven fabric, and all the warp yarns are pushed against each other due to the high warp density of the woven fabric. As shown in FIGS. 1 and 2, the warp yarn C pushes the warp yarn B in the left-direction and the warp yarn D pushes the warp yarn E in the right direction. As a result, the warp yarn C moves in the left direction while causing the warp yarns B and E to further raise from the front and back surfaces of the woven fabric, and then get under the warp yarns B, and the warp yarn D moves in the right direction and gets under the warp yarn E. Accordingly, a small gap is formed between the warp yarns C and D.

The same phenomenon as mentioned for the warp yarns happens for the weft yarns. In the mock leno weave structure segments in FIGS. 1 to 3, the weft yarns a, c, d and f alternately appear on the front and back surfaces of the woven fabric for every one warp yarns, in the same manner as in the plain weave structure. The weft yarns b and e alternately appear on the front and back surface of the woven fabric for every three warp yarns. These weft yarns b and e have a lower frequency in crossing with the warp yarns than that of the weft yarns a, c, d and f, and thus, are slightly raised from the woven fabric surfaces. Also, each weft yarn pushes the adjacent weft yarns due to the high weft density of the woven fabric. Referring to FIGS. 1 and 2, the weft yarn C pushes upward the weft yarn b and the weft yarn d pushes downward the weft yarn e. As a result, the weft yarn C moves downward so as to cause the weft yarns b and c to further raise from the front and back surfaces of the woven fabric, and then gets under the weft yarn b. The weft yarn d moves upward and gets under the weft yarn e. Therefore, a small gap is formed between the weft yarns c and d.

Referring to FIGS. 1 and 2, a small opening 4 defined by the warp yarns C and D and the weft yarns c and d is in the form of a pinhole. This pinhole-like opening 4 allows a large amount of an inflation gas to pass in a short time through an air bag formed from the filter cloth, and simultaneously improves the deflating property of the air bag after the inflation is completed without reducing the seam slippage resistance of the air bag. Referring to FIGS. 1 to 3, in the ground plain weave structure segment 2, the warp yarns G, H, I, J . . . alternately appear on the front and back surfaces of the woven fabric with respect to every one weft yarn. Also, the weft yarns g, h, i, j . . . alternately appear on the front and back surfaces of the woven fabric with respect to every one warp yarn. Namely, in this ground plain weave structure, each yarn has the same flexural structure as the others, and a strong and dense weave structure is formed. Therefore, the warp and weft yarns are not allowed to move in relation to each other, and no pinhole-like opening is formed in the ground weave structure segment. Accordingly, the ground plain weave structure causes the seam slippage resistance of the resultant woven fabric to be enhanced.

Generally, a woven fabric having a weave structure by which a high gas-permeability is caused, tends to exhibit a poor resistance to seam slippage. In the filter cloth of the present invention, however, since the high gas-permeability weave structure segments having the pinhole-like openings 4 are evenly distributed in a ground weave structure segment having a high yarn density, the air bag made from the filter cloth enables a large amount of an inflation gas to be discharged instantly and simultaneously exhibits an excellent seam slippage resistance.

In the filter cloth shown in FIGS. 1 to 3, the excellent seam slippage resistance thereof is derived from the ground plain weave structure. In this filter cloth, the pinhole-like openings formed in the mock leno weave structure segments are very small, and thus do not affect the seam slippage resistance of the filter cloth as a whole.

Also, in a conventional filter cloth which has a plain weave structure or twill weave structure (each in a single weave structure) and thus allows an inflation gas to be discharged through the whole surface of the cloth, the gaps between the yarns are significantly smaller than the pinhole-like openings of the filter cloth of the present invention and therefore the air bag made from a conventional filter cloth exhibits a poor deflating property after the inflation. In the filter cloth of the present invention shown in FIGS. 1 to 3, however, the pinhole-like openings are larger than the gaps between the yarns in the ground weave structure segment, and therefore, the air bag made from this filter cloth exhibits a good deflating property after the inflation. Accordingly, even in the unlikely event that the air bag made from the filter cloth of the present invention having the weave structure shown in FIGS. 1 to 3 were erroneously inflated while a motorcar or aircraft is in operation, the air bag can be immediately deflated and thus the vision of the occupant is not obstructed for a long time. Also, this air bag can reduce an acceleration (chest G or head G) force applied to the body of an occupant upon clashing to the same extent as a conventional air bag with vent holes. Conventional air bags made from a conventional filter cloth and having a poor deflating property are disadvantageous in that the chest G and head G are significantly high.

In the filter cloth of the present invention as shown in FIGS. 1 to 3, the pinhole-like openings are not distributed close to each other, but straggle in the ground weave structure segments, namely the tough and dense plain weave structure segment, and therefore substantially do not obstruct the seam slippage resistance of the filter cloth. Also, since the pinhole-like openings 4 are substantially evenly distributed in the ground weave structure segment, the filter cloth is advantageous in that the trimming of the cloth for cutting for producing the air bag can be made freely, and thus the whole filter cloth can be freely employed.

The gas-permeability of the whole filter cloth having mock leno weave structure segments can be adjusted by controlling the opening area of the pinhole-like openings and the number of the openings per unit area of the cloth. Particularly, in the filter cloth composed of high gas-permeability mock leno weave structure segments and a ground plain weave structure segment, the gas-permeability of the cloth can be increased by increasing the proportion of the mock leno weave structure segments to the whole weave structure. Also, to reduce the gas-permeability of the filter cloth, the proportion of the ground plain weave structure segment to the whole weave structure should be increased.

In the filter cloth of the present invention as mentioned above, other weave structure segments than those mentioned above may be included in the weave structure. For example, twill weave structure, twill derivative weave structure, ripstop weave structure, mat weave structure and/or crape weave structure segments may be mixed in the ground weave structure segment, to closely control the gas-permeability of the filter cloth to more than that of the ground plain weave structure segment alone. However, the weave structure with highest seam slippage resistance is a plain weave structure, and the addition of other weave structures as mentioned above causes a reduction in the seam slippage resistance.

Portions of the mock leno weave structure segments may be replaced by other weave structures. However, the mock leno weave structure can provide relatively large and appropriate pinhole-like openings per smallest unit area of the cloth, so as to attain an effective discharge of the inflation gas and a good deflation of the inflated air bag, and can impart the highest seam slippage resistance to the air bag.

The mock leno weave structure is a weave structure formed by partially changing the plain weave structure and thus includes as portions thereof the plain weave structure. Therefore, when the mock leno weave structure is mixed in the plain weave structure, they are fully compatible with each other. Also, the tensile strengths and the ultimate elongations of these two structures are respectively close to each other, and thus the mixed weave structure is most appropriate for the filter cloth.

In the filter cloth of the present invention, preferably the ground segment has a single plain weave structure and the high gas-permeability segments have a mock leno weave structure in which pinhole-like openings are formed. Also, in the filter cloth of the present invention, the high gas-permeability weave structure segments are preferably distributed at substantially regular intervals both in the warp and weft directions in the ground weave structure segment.

The mock leno weave structure formed in the filter cloth of the present invention is preferably a smallest mock leno weave structure composed of 6 warp yarns (warp yarns A to F in FIGS. 1 and 2) and 6 weft yarns (weft yarns a to f in FIGS. 1 and 2), namely 12 yarns in total. One smallest mock leno weave structure unit can include one pinhole-like opening. The larger the area of the mock leno weave structure segment necessary for forming one pinhole-like opening, the smaller the area of the high density ground weave structure segment in the resultant filter cloth and thus the lower the seam slippage resistance of the resultant filter cloth.

Figure 4:
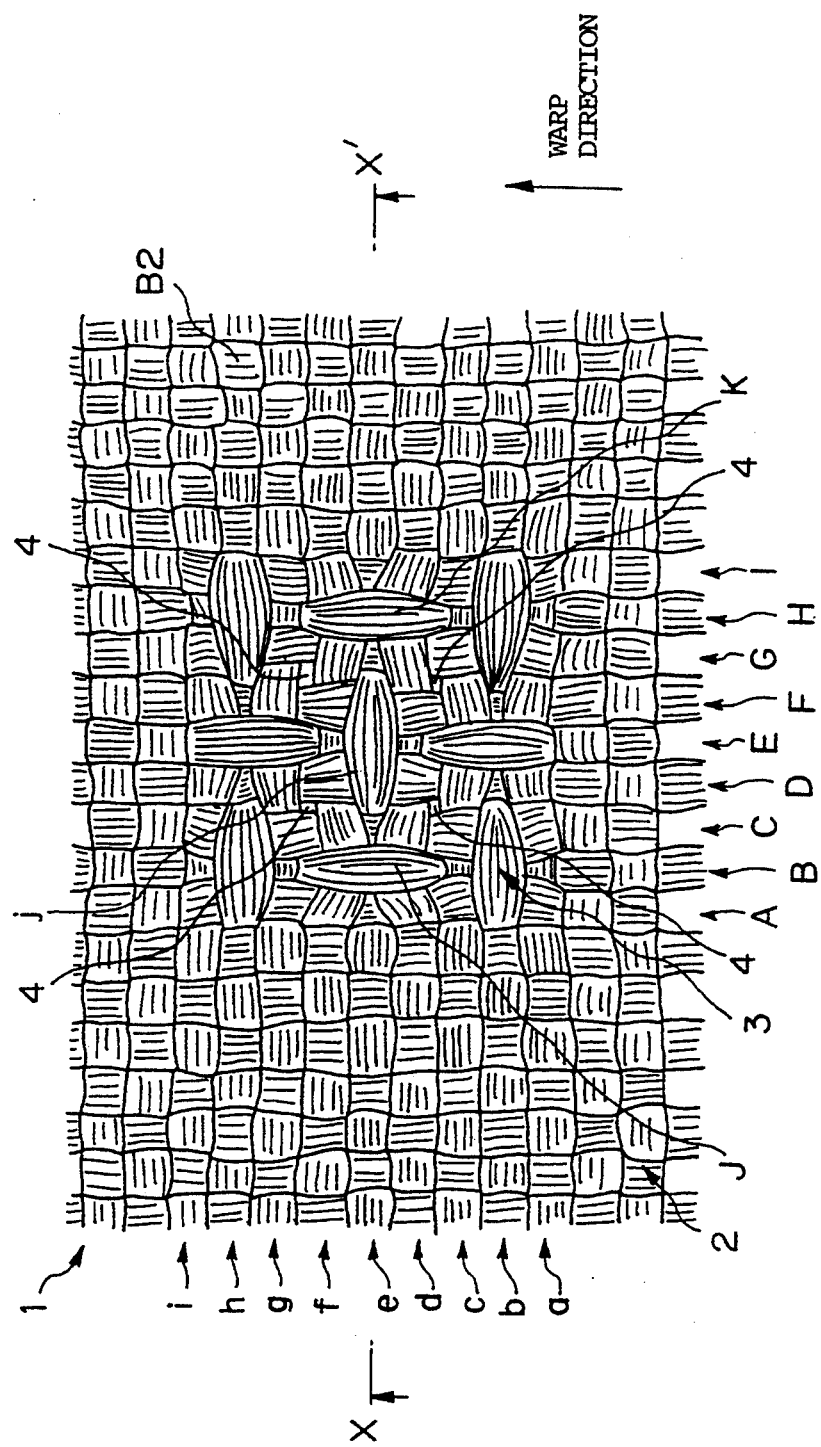
FIG. 4 is an explanatory plane view of a weave structure of another embodiment of the filter cloth of the present invention for air bags.
Figure 5:
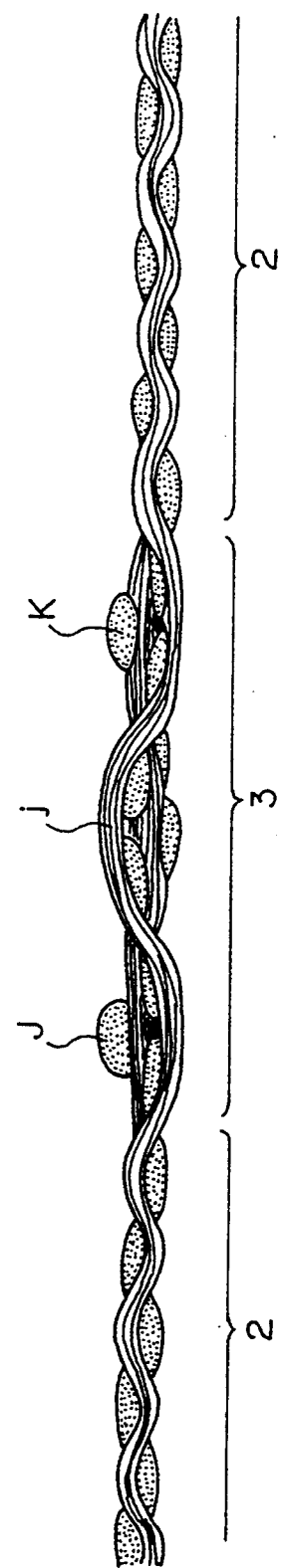
FIG. 5 is an explanatory cross-sectional profile of the weave structure indicated in FIG. 4, along a line X—X'.

The mock leno weave structure for the filter cloth of the present invention may be the weave structure as shown in FIG. 4 (a plane view) and FIG. 5 (a cross-sectional profile along the line X—X' in FIG. 4). This weave structure corresponds to that described in Example 7 hereinafter. In FIGS. 4 and 5, a filter cloth 1 is composed of a ground plain weave structure segment 2 and mock leno weave structure segments 3 distributed in the ground segment at a substantially constant distribution density, and in each mock leno weave structure segment, pinhole-like openings 4 are formed.

In this cloth, four pinhole-like openings 4 are formed per mock leno weave structure unit. The mock leno weave structure indicated in FIGS. 4 and 5 is composed of 9 warp yarns and 9 weft yarns, namely 18 yarns in total per weave structure unit thereof. Therefore, this mock leno weave structure unit has a larger area than that of the mock leno weave structure unit shown in FIGS. 1 to 3. However, since the number of the pinhole-like openings per weave structure unit of FIGS. 4 and 5 is four times that of FIGS. 1 to 3, the distribution number of the pinhole-like openings in the whole filter cloth increases and the gas-permeability of the cloth is increased. Where a filter cloth having the same gas-permeability as that of the filter cloth comprising the mock leno weave structure segments shown in FIGS. 1 to 3 is produced by utilizing the mock leno weave structure shown in FIGS. 4 and 5, the occupation area proportion of the mock leno weave structure segments to the ground weave structure segment can be reduced to a relatively small value and thus a reduction of the seam slippage resistance of the resultant filter cloth can be prevented.

To enhance the inflation gas-discharging effect and the deflating property of the air bag, it is preferable to increase the occupation area proportion of the mock leno weave structure segments to the ground plain weave structure segment.

The filter cloth of FIGS. 1 to 3 is composed of repeating units each consisting of one mock leno weave structure segment and a portion of the ground weave structure segment located between the mock leno weave structure segment, and another mock leno weave structure segments adjacent thereto in both the warp and weft directions of the cloth. Each repeating unit is preferably composed of 7 to 100 warp yarns and 7 to 100 weft yarns. If the numbers of the warp and weft yarns are less than 7, no ground weave structure can be formed, and thus the resultant filter cloth exhibits a reduced seam slippage resistance. Also, if the numbers of the warp and weft yarns are more than 100, the occupation area proportion of the ground weave structure segment becomes to high, the resultant filter cloth exhibits an excessively reduced gas permeability, and thus the resultant filter cloth is not suitable for air bags. More preferably, each repeating unit is composed of 8 to 80 warp yarns and 8 to 80 weft yarns.

In the filter cloth of the present invention indicated in FIGS. 4 and 5, each repeating unit consisting of one mock leno weave structure segment and a portion of a ground weave structure segment located between two adjacent mock leno weave structure segments, in both the warp and weft directions, is preferably composed of 9 to 100 warp yarns and 9 to 100 weft yarns. The repeat unit is more preferably composed of 10 to 80 warp yarns and 10 to 80 weft yarns.

In the filter cloth of the present invention shown in FIGS. 1 to 5, the pinhole-like openings formed in the mock leno weave structure segments preferably have a size of 50 to 500 $\mu$m. The term "size" of the pinhole openings refers to a diameter of a circumcircle of the openings which are substantially circular or polygonal, or a major axis length of the openings which are substantially oval.

If the size of the pinhole-like opening is less than 50 $\mu$m, it becomes difficult to discharge the inflation gas from the resultant air bag, in an instant, and exhibits a decreased deflating property. Also, if the pinhole-like opening size is more than 500 $\mu$m, the resultant mock leno weave structure segments exhibit a decreased seam slippage resistance. More preferably, the size of the pinhole-like openings is 80 to 400 $\mu$m.

The pinhole-like openings mentioned above are preferably distributed in the number of 1 to 150 per units per area of 6.45 $cm^2$(1 $in^2$) of the filter cloth. If the number of the pinhole-like openings is more than 150 holes/$in^2$, the resultant filter cloth exhibits a decreased seam slippage resistance. Also, if the pinhole-like opening number is less than 1/6.45 $cm^2$, it becomes difficult for the resultant air bag to discharge the inflation gas in an instant, and exhibits a decreased deflating property. More preferably, the number of the pinhole-like openings is in the range of from 3 to 120 holes/$in^2$.

The filter cloth of the present invention preferably has an average gas-permeability of 0.6 ml/$cm^2$/sec/125 Pa or more. If the gas-permeability is less than 0.6 ml/$cm^2$/sec/125 Pa, the resultant air bag cannot instantly fully discharge a large amount of inflation gas and thus the inner pressure of the air bag increases excessively, endangering the occupant. Also, the deflating property of the air bag is decreased. The gas-permeability is more preferably 0.7 ml/$cm^2$/sec/125 Pa or more, still more preferably 0.8 to 20 ml/$cm^2$/sec/125 Pa.

In the filter cloth of the present invention, it is preferable that the gas-permeability of a portion of the cloth which exhibits the highest gas-permeability is three times or less the gas-permeability of another portion of the cloth which exhibits the lowest gas-permeability. If the highest gas-permeability is more than three times the lowest gas-permeability, the resultant filter cloth exhibits a reduced evenness in gas-permeability, and thus the freedom in trimming and cutting the filter cloth is reduced and the utilization efficiency of the filter cloth decreases significantly.

A more preferable ratio of the highest gas-permeability to the lowest gas-permeability is 2 or less, still more preferably 1.2:1 to 1.8:1. The filter cloth of the present invention, in which a plurality of pinhole-like openings are substantially evenly distributed in the dense ground weave structure segment, allows a smaller difference between the highest gas-permeability and the lowest gas-permeability portions than that of a conventional cloth having no pinhole-like openings.

The filter cloth of the present invention having the above-mentioned weave structure is characterized by a significantly low average seam slippage value. Namely, by utilizing the present invention, the average seam slippage value can be reduced to a level of 7 mm or less. If the average seam slippage value is more than 7 mm, the inflation gas can pass selectively through the opened seams and thus the occupant gets burnt and the air bag is broken due to a growth of the seam openings. More preferably, the average seam slippage value is 5 mm or less.

Figure 6:
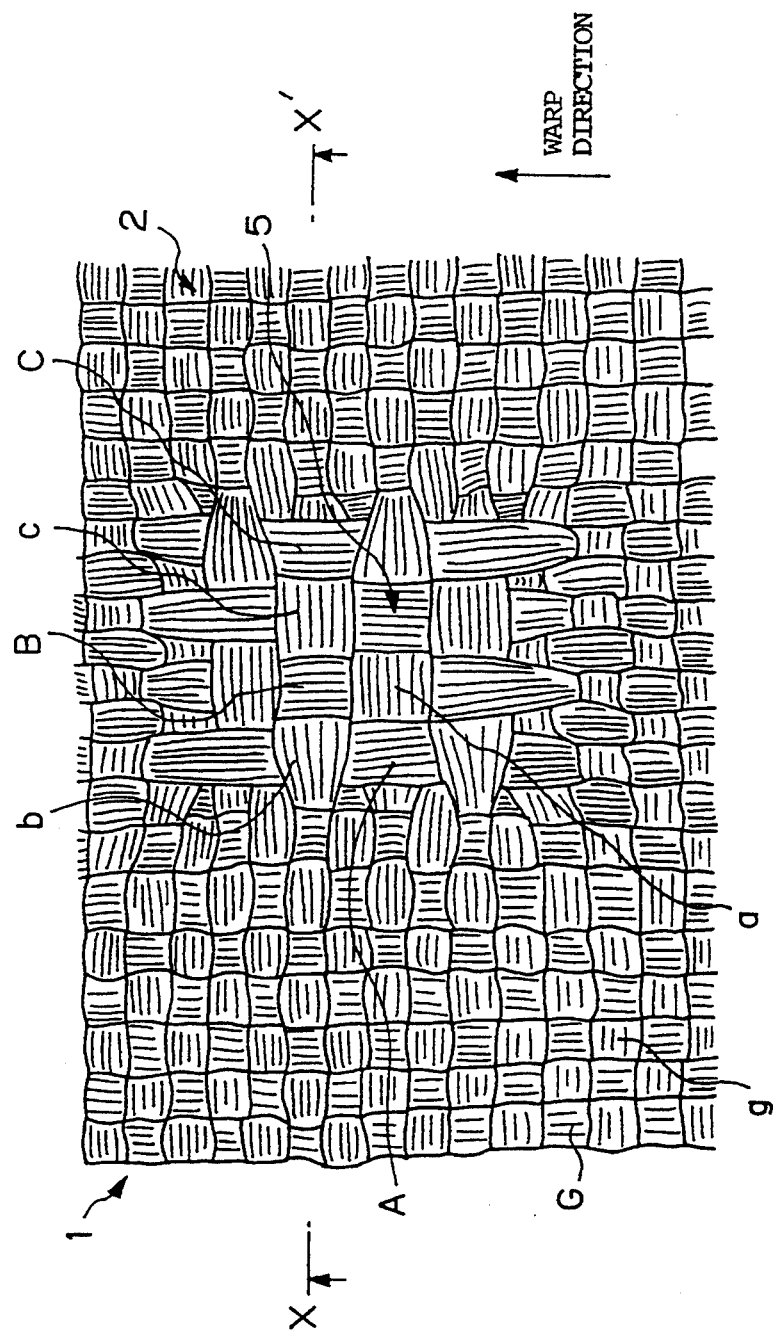
FIG. 6 is an explanatory plane view of a weave structure of still another embodiment of the filter cloth of the present invention for air bags.
Figure 7:
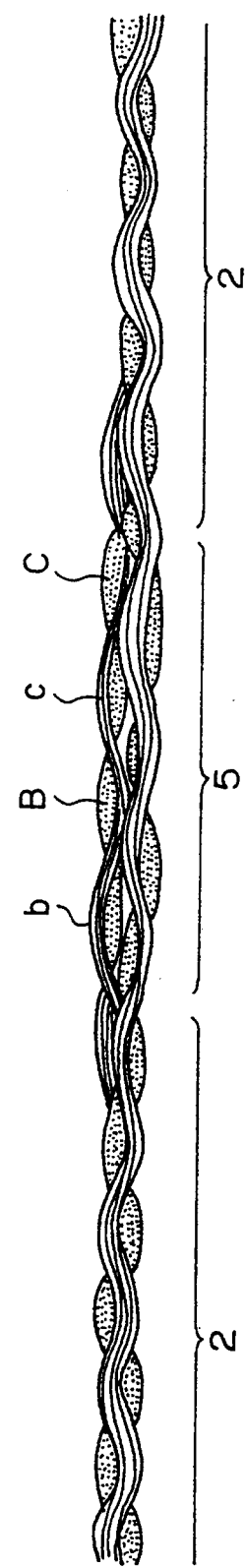
FIG. 7 is an explanatory cross-sectional profile of the weave structure indicated in FIG. 6, along a line X—X'.

② A filter cloth having high gas-permeability weave structure segments with a double plain weave structure:

FIGS. 6 and 7 show a weave structure of an embodiment of the filter cloth of the present invention having the above-mentioned high gas-permeability double plain weave structure segments, and correspond to Example 8 which will be shown hereinafter. FIG. 6 is an explanatory plane view of the above-mentioned weave structure and FIG. 7 is an explanatory cross-sectional profile of the weave structure of FIG. 6 along the line X—X'. These drawings show a filter cloth in which a plurality of double plain weave structure segments are evenly straggled in a ground weave structure segment having a single plain weave structure. The filter cloth shown in FIGS. 6 and 7 is composed of a ground single plain weave structure segment 2 and double plain weave structure segments 5 distributed in the ground segment. Each of the double plain weave structure segments 5 is composed of at least one double plain weave structure unit. In FIGS. 6 and 7, the double plain weave structure segments 5 have a front side ply composed of 4 warp yarns and 4 weft yarns and a back side ply composed of another 4 warp yarns and another 4 weft yarns. These warp and weft yarns corresponds to 8 warp yarns and 8 weft yarns from which the plain weave structure of the single plain weave structure segment 2 is formed. In the double plain weave structure, the warp and weft yarns commonly form the front and back side plies which are separate structures from each other. Therefore, the density of yarns appearing on the front or back side ply is ½ of that of yarns in the ground single plain weave structure segment 2. Namely, the width of the warp yarns A, B and C and the width of the weft yarns a, b and c in the double plain weave structure segment 5 are larger than that of the warp yarns G and the width of the weft yarns g in the single plain weave structure segment 5, and thus are in a significantly widened form. Therefore, the double plain weave structure segment 5 exhibits an increased gas-permeability. Nevertheless, since the fibers contained in the yarns located in this segment 5 are evenly distributed, the segment 5 exhibits an enhanced filtering effect for fine particles.

In the filter cloth of the present invention having the above-mentioned high gas-permeability double plain weave structure segments, a repeating unit consisting of one double plain weave structure segment, and a portion of the ground weave structure segments located between the one double plain weave structure segment and another double plain weave structure segments located adjacent thereto in the warp and weft directions, is preferably composed of 9 to 100 warp yarns and 9 to 100 weft yarns.

Also, preferably, the double plain weave structure segments each have an area of 3 to 200 mm. Further, preferably, the double plain weave structure segments are distributed at a density of 1 to 150/6.45 cm².

The filter cloth of the present invention in which the ground single weave structure segment and the high gas-permeability double weave structure segments each have a plain weave structure, has a highest flexure frequency of the yarns and thus the densest structure having a high tensile strength. Therefore, this filter cloth exhibits enhanced seam slippage resistance and burst strength. The filter cloth having the abovementioned weave structure is particularly suitable as a filter cloth for forming air bags for driver's seat.

Figure 8:
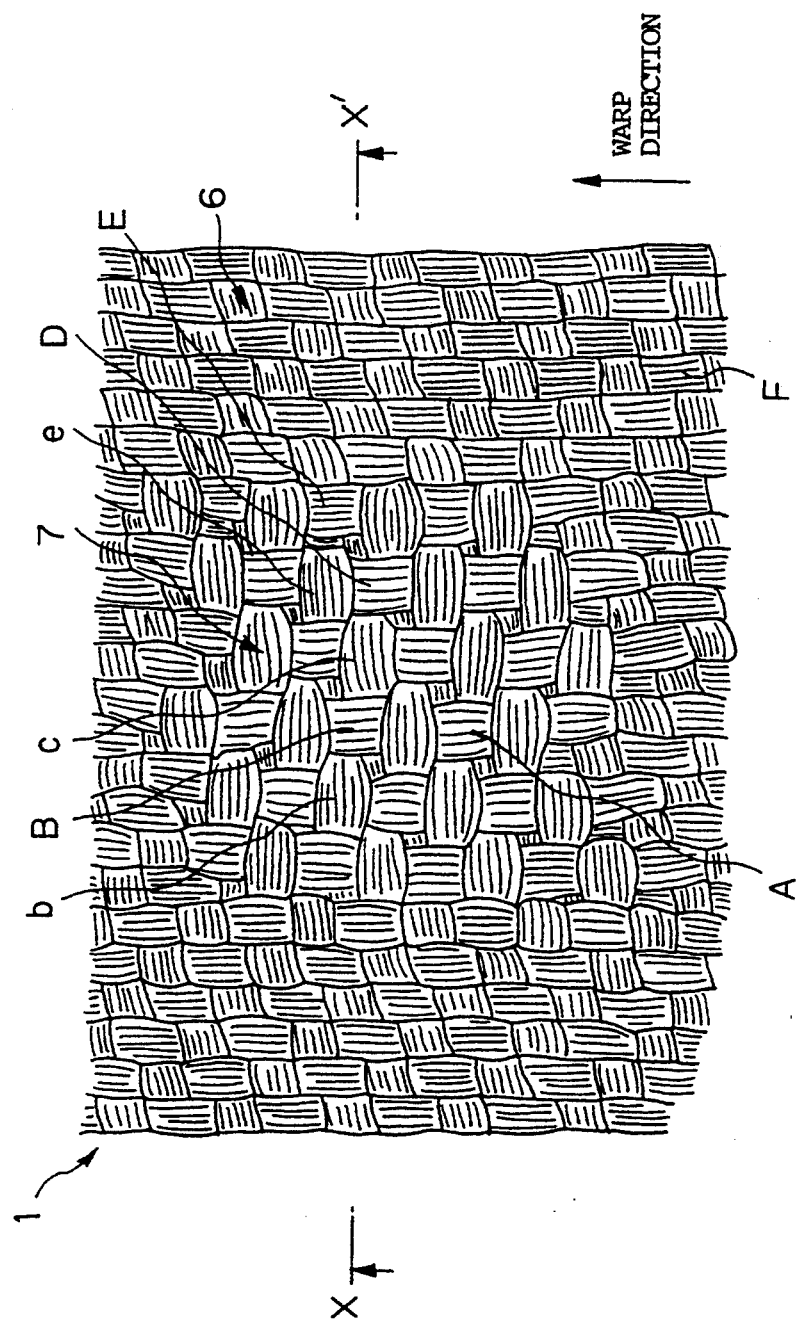
FIG. 8 is an explanatory plane view of a weave structure of further another embodiment of the filter cloth of the present invention for air bags.
Figure 9:
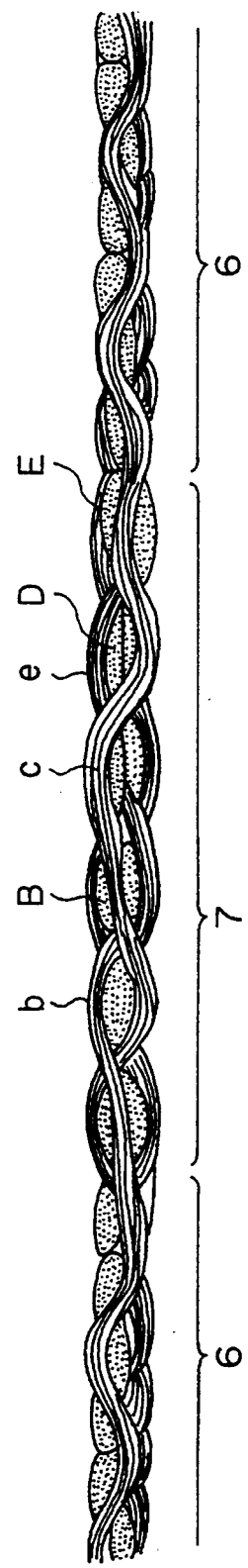
FIG. 9 is an explanatory cross-sectional profile of the weave structure indicated in FIG. 8, along a line X—X'.

③ A filter cloth in which the high gas-permeability weave structure is a double twill weave structure:

FIGS. 8 and 9 show another embodiment of the filter cloth of the present invention and correspond to Example 9 which will be indicated hereinafter. FIG. 8 shows an explanatory plane view of a filter cloth having high gas-permeability double twill weave structure segments, and FIG. 9 shows an explanatory cross-sectional profile of the filter cloth of FIG. 8, along the line X—X'. These drawings show a filter cloth in Which a plurality of double twill weave structure segments are evenly straggled in a ground single twill weave structure segment. In the filter cloth of FIGS. 8 and 9, a plurality of high gas permeability double twill weave structure segments 7 are evenly distributed in a ground single twill weave structure segment 6. Each high gas-permeability double twill weave structure segment consists of at least one double twill weave structure unit. For example, the double twill weave structure unit shown in FIGS. 8 and 9 is composed of 12 warp yarns and 12 weft yarns, and in the front side ply of the cloth, 6 warp yarns and 6 weft yarns appear, and in the back side ply of the cloth, 6 warp yarns and 6 weft yarns appear. Also, in the ground double weave structure segment, the front side ply of the cloth has a 2/1 twill structure and the back side ply of the cloth has a ½ twill weave structure. Compared with this, in the high gas-permeability double twill weave structure segment 7, both the front and back side plies of the cloth have a 2/1 twill weave structure. As mentioned above, since the warp yarns and the weft yarns in the high gas permeability double twill weave structure segment 7 appear on both the front side ply surface and the back side ply surface, the density of the yarns appearing on each of the front and back surfaces is ½ of that of the single twill weave structure. Also, the warp yarns A in the double twill weave structure have a larger width than the width of the warp yarn F in the single twill weave structure and becomes flat. Therefore, the double twill weave structure exhibits the same enhancing effects in the gas permeability and in the filtering efficiency, as those of the double plain weave structure.

As mentioned above, the high gas-permeability double twill weave structure segments are straggled preferably at a substantially constant distribution density in a ground single twill weave structure segment. Also, in the filter cloth of the present invention having the high gas permeability double twill weave structure segments, a repeating unit consisting of one double twill weave structure segment and a portion of the ground segment located between the one double twill weave structure segment and another double twill weave structure segments located adjacent thereto in the warp and weft directions, is preferably composed of 13 to 100 warp yarns and 13 to 100 weft yarns.

Preferably, each double twill weave structure segment has an area of 3 to 200 mm$^2$. Also, the double twill weave structure segments are preferably distributed at a density of 1 to 150/6.45 cm$^2$.

In this filter cloth, since the ground single twill weave structure segment and the high gas permeability double twill weave structure segments have the twill weave structure, the twill weave-forming yarns have a lower flexure frequency than that of the plain weave-forming yarns, and thus the resistant filter cloth exhibits an increased average gas-permeability. Therefore, this type of filter cloth is suitable for forming air bags for a passenger's seat.

In the above-mentioned embodiments ②  and ③ of the filter cloth, the ground plain or twill weave structure segment imparts a high seam slippage resistance to the resultant filter cloth and the high gas-permeability double plain or twill weave structure segments impart a moderate gas-permeability to the resultant filter cloth. Generally, the filter cloth for air bags is required to have a specific gas-permeability which is variable depending on design of the driver's or passenger's seat. The gas-permeability can be easily changed by adjusting the occupation area ratio of the ground single weave structure segment to the high gas-permeability double weave structure segments. When the proportion of the occupation area of the double weave structure segments becomes too high, although the resultant filter cloth exhibits an enhanced gas-permeability, the seam slippage resistance of the cloth becomes slightly poor. To maintain the seam slippage resistance at as high a level as possible, it is preferable that a plurality of double weave structure segments having an unit area as small as possible be evenly distributed in as large a number as possible in the ground single weave structure segment.

The term "to evenly distribute" means "to substantially evenly distribute a plurality of double weave structure segments in a continuous ground (matrix) weave structure segment without local concentrations of the double weave structure segments, so that the resultant filter cloth exhibits as a whole a uniform filtering property, and thus can be subjected to a free trimming for cutting without considering the positions of the double weave structure segments." It is important that the double weave structure segments are straggled in the ground single weave structure segment to such an extent that a highest gas-permeability is 3 times or less than lowest gas-permeability measured at random over a measurement area of 100 cm$^2$. If the double weave structure segments are locally distributed, the gas-permeability of the resultant filter cloth varies locally. Therefore, the filter cloth cannot be subjected to free trimming for cutting into pieces for forming the air bag. Also, the filter cloth with locally distributed double weave structure segments exhibits a locally reduced seam slippage resistance. In this case, when the resultant air bag is inflated, the seam having the reduced seam slippage resistance is broken and enlarged so that the air bag is broken.

In the embodiments 2 and 3 of the filter cloth, the yarn density of the yarns appearing on the front or back side surface of each high gas-permeability double weave structure segment is half of that in the ground weave structure segment, and thus the yarns located in the double weave structure segment have a larger width than those in the ground segment and become significantly flattened. Preferably, the largest width of the yarns appearing on each surface of the double weave structure segment is at least 1.3 times the largest width of the yarns located in the ground segment. When the ratio is less than 1.3, the yarns in the double weave structure segment are densely bundled and thus have a relatively small width. Therefore, in the resultant segment, the gaps between the yarns become larger, and the inflation gas can easily pass through the gaps between the yarns. Accordingly, this filter cloth exhibits a decreased filtering effect. Since the yarns in the double weave structure segment are flattened and have an enlarged width, the resultant filter cloth exhibits an enhanced filtering effect. Also, since the filter cloth does not allow the inflation gas to pass through specific local portions of the cloth, breakage or perforation of the air bag can be prevented. The largest width of the yarns located in the double weave structure is preferably 1.5 times or more but not more than 5.0 times the largest width of the yarns located in the ground weave structure.

As yarns which can be easily flattened as mentioned above, filament yarns can be used.

Also, in the filter cloth as mentioned above, preferably, each double weave structure segment has a unit area as small as possible, and a large number of the double weave structure segments are evenly straggled in the ground weave structure segment. The unit area of the double weave structure segments is preferably 3 to 200 mm$^2$. Also, the double weave structure segments are preferably straggled at a distribution density of 1 to 150/6.45 cm$^2$(1 in$^2$) in the filter cloth.

As mentioned above, in the filter cloth of the present invention, the repeating unit consisting of one high gas-permeability double twill weave structure segment and a portion of the ground single twill weave structure segment continued thereto is preferably composed of 9 to 100 warp yarns and 9 to 100 weft yarns. If the warp and weft yarn numbers are less than 9, the occupation area of the resultant ground single twill weave structure portion in each repeating unit becomes too small, and thus the seam slippage resistance is reduced. Also, if the warp and weft yarn numbers are more than 100, the occupation area of the single twill weave structure portion in the repeating unit becomes too large and thus the resultant filter cloth exhibits too low an average gas-permeability. More preferably, the repeating unit is composed of 10 to 80 warp yarns and 10 to 80 weft yarns.

The filter cloth of the present invention having the high gas-permeability double twill weave structure segments optionally comprise another weave structure segments straggled in the ground weave structure segment, in addition to the above-mentioned segments. Particularly, in the filter cloth in which the ground segment thereof has a plain weave structure, twill, twill derivative, ripstop, mat and/or crape weave structure segments may be straggled, in the ground segment. The inclusion of the other weave structures in the ground segment can cause the resultant ground segment to exhibit a slightly increased gas-permeability compared with that of the ground segment having a plain weave structure alone.

The above-mentioned type of filter cloth preferably has an average gas-permeability of 0.6 ml/cm$^2$/sec/125 Pa or more. If the average gas-permeability is less than 0.6 ml/cm$^2$/sec/125 Pa, the resultant air bag does not allow instant discharge of a large amount of inflation gas, and thus the inner pressure of the air bag increases; endangering the occupant. Also, in this case, the resultant air bag exhibits a decreased deflating property. The average gas-permeability of the filter cloth is more preferably 0.7 ml/cm$^2$/sec/125 Pa or more, still more preferably 0.8 to 20 ml/cm$^2$/sec/125 Pa.

In the above-mentioned type of filter cloth of the present invention, the gas-permeability of the portion of the cloth which exhibits the highest gas-permeability is preferably 3 times or less the gas-permeability of another portion of the cloth which exhibits the lowest gas-permeability. If the highest gas-permeability is more than 3 times the lowest gas-permeability, the resultant filter cloth exhibits a reduced evenness in gas-permeability and thus decreased freedom in trimming for cutting the cloth into pieces for forming the air bag. Also, sometimes, the sewing work of the filter cloth becomes difficult. The ratio of the highest gas-permeability to the lowest gas-permeability is more preferably 2.0:1 or less, still more preferably 1.2:1 to 1.8:1.

The above mentioned embodiments ②  and ③ of the filter cloth are advantageous in their low average seam slippage value. Namely, the filter cloths of types ② and ③ preferably have an average seam slippage value of 7 mm or less. Generally, when the average seam slippage value is more than 7 mm, the inflation gas can easily pass selectively through the opened seams so as to burn the occupant. Also, the inflated air bag may be broken due to an enlargement of the opened seams. The average seam slippage value is more preferably 6 mm or less.

(2) Production of types 1, 2 and 3 of filter clothes:

The filter cloth of the present invention can be produced from warp and weft yarns consisting of synthetic fibers by using a popular weaving machine (loom), for example a shuttle loom, water jet loom, rapier loom or air jet loom usable for, for example, single plain weave or single twill weave.

In this weaving procedure, the mock leno weave structure, double plain weave structure and double twill weave structure for forming the high gas-permeability weave structure segments can be included in the ground weave structure by attaching a bobby device, jacquard machine or tappet device to the weaving machine. Among the weaving means for the filter cloth, a most preferable means is a water jet loom equipped with a dobby device, because this means has a high workability and a low operating cost.

The gray fabric produced by the weaving process is preferably scoured and then heat-set to shrink and dimensionally fix the fabric in the warp and weft directions thereof. The resultant fabric is used as a filter cloth.

The production process will be further explained below.

As the synthetic fiber yarns, synthetic filament yarns, for example, polyester and nylon filaments are preferably used. The synthetic filament yarns have a higher tensile strength than that of spun yarns or stretch-broken, fascinated yarns and thus are useful for producing air bags having an enhanced burst strength.

Among the synthetic filament yarns usable for the present invention, polyester filament yarns, especially ones having a yarn thickness of 200 to 600 denier are preferred. If the yarn thickness is less than 200 denier, the resultant air bag sometimes exhibits an unsatisfactory burst strength. Also, if the yarn thickness is more than 600 denier, the resultant filter cloth sometimes has too high a basis weight. A more preferable yarn thickness is 250 to 550 denier, still more preferably 300 to 500 denier.

In the filament yarns usable for the present invention, the individual filaments, from which the yarns are formed, preferably have a thickness of 0.5 to 3.0 denier. If the individual filament thickness is less than 0.5 denier, the resultant filament yarns sometimes exhibit an unsatisfactory weaving property. Also, if the thickness is more than 3.0 denier, the resultant fabric exhibits too high a stiffness. The individual filament thickness is more preferably 0.8 to 2.5 denier, still more preferably 1.0 to 2.3 denier.

The filament yarns usable for the present invention are preferably each composed of 140 to 840 filaments. If the filament number is less than 140, the resultant ground weave structure segment has too high a gas-permeability and the gas-permeability of the specific weave structure for the high gas-permeability segments becomes difficult to control to a moderate level. Also, if the filament number is more than 840, the resultant yarns become difficult to weave. A more preferable filament number is 180 to 600, still more preferably 200 to 400.

The filament yarns, particularly the polyester filament yarns usable for the present invention preferably have a tensile strength of 9 g/denier or more. If the tensile strength is less than 9 g/denier, the resultant air bag sometimes exhibits an unsatisfactory burst strength. A more preferable tensile strength of the filament yarns is 9.2 to 12 g/denier.

The filament yarns usable for the present invention preferably have a dry thermal shrinkage of 3 to 13% at a temperature of 150° C. If the thermal shrinkage is less than 3%, sometimes, the shrinkage of the resultant woven fabric by the scouring and heat-setting procedures is too low, and thus the gas-permeability of the ground weave structure segment cannot be reduced to a desired level and the resultant woven fabric does not exhibit a tensile strength high enough to impart a satisfactory burst strength to the air bag. If the thermal shrinkage is more than 13%, sometimes, it becomes difficult to evenly shrink the woven fabric by the heat-setting procedure, and the mock leno, double plain or double twill weave structure segments exhibit uneven gas-permeability. The dry thermal shrinkage is more preferably 3.5 to 12%.

In the production of the filter cloth of the present invention, the synthetic filament yarns, particularly the polyester filament yarns are twisted at a twist multiplier of 2500 or less or untwisted, and subjected to a weaving procedure. The twist multiplier refers to a product of the square root of the thickness value in denier of a filament yarn and a twist number in turns/m of the yarn. If the twist multiplier is more than 2500, the gas-permeability of the ground weave structure segment cannot be satisfactorily reduced, and thus it becomes difficult to control the gas-permeability of the resultant filter cloth to a desired value by a combination of at least the ground segment and high gas-permeability segments.

The twist multiplier is more preferably 0 to 2300. Non-twisted filament yarns are most preferable.

In the weaving of the filter cloth of the present invention, the cover factors (which will be indicated by CF hereinafter) of the warp yarns and the weft yarns in the gray fabric are preferably controlled to 600 to 1300, respectively. The CF of the warp yarns refers to a product of the square root value of the thickness (denier) of the warp yarns and the warp density value (yarns/inch). The Cf of the weft yarns refers to a product of the square root value of the thickness (denier) of the weft yarns and the weft density value (yarns/inch).

If the CF is less than 600, sometimes, it becomes impossible to make the gaps between the filament yarns adjacent to each other satisfactory small even when the filter cloth is heat-shrunk by a dry-heat-setting procedure, thus the ground segment exhibits a high gas-permeability and the resultant filter cloth exhibits a poor seam slippage resistance. Also, if the CF is more than 1300, the resultant filter cloth exhibits too high a filament packing, and thus too high a friction between the filaments and too high a restriction in movement of the filaments relative to each other. Therefore, the filter cloth cannot be fully shrunk by the dry-heat setting procedure, and the gas-permeability of the ground segment is increased for the same reasons as mentioned above. The gray fabric more preferably exhibits a cover factor of 750 to 1200.

In the production of the gray fabric for the filter cloth of the present invention, it is preferred to control a difference in cover factor between the warp yarns and the weft yarns to a level of 200 or less. If the differential cover factor is more than 200, where an external force is applied to the filter cloth, the stress generated in the cloth is concentrated in the direction in which the cover factor is smaller, and thus the resultant air bag exhibits a reduced burst strength. The differential cover factors between the warp and weft yarns are more preferably 150 or less.

The gray fabric for the filter cloth of the present invention is scoured and then a heat setting is applied to the scoured fabric by a metal surface contact and tension type roll setting system so as to fully shrink the fabric to an extent corresponding to the dry thermal shrinkage of the filament yarns. In this procedure, the filament yarns are fully shrunk and a crimped structure is generated on the filament yarns per se.

In this shrinking procedure, to fully enhance the seam slippage resistance of the filter cloth, it is important to fully increase the cover factor of the ground structure segment. In the ground structure segment, the shrinkage and the crimped structure are generated by the heat-setting. To fully enhance the seam slippage resistance of the ground structure segment, it is important to selectively promote the shrinkage above and to present the generation of the crimped structure as much as possible.

The metal surface contact, tension type rollsetting system is advantageous in that the shrinkage of the filament yarns can be significantly realized and the formation of the crimped structure can be prevented to a moderate extent. In this case, the filament yarns must have a moderate dry thermal shrinkage.

For example, when a tenter-processing system under substantially non-tensing conditions, as disclosed in Canadian Patent No. 974,745 is utilized, crimps are easily generated. In this system, since the edge ends of the fabric are held and the center portion of the fabric is mainted under a loosened condition during the heatsetting procedure, the fabric cannot be evenly tensed. Therefore the gas-permeability and the seam slippage resistance of the resultant heat-set fabric are sometimes uneven.

In consideration of the above-mentioned disadvantages, the metal surface contact, tension type roll setting system is preferably utilized for the present invention. In this case, when the woven fabric is completely tensed, a tensile tension slightly lower than the heat shrinkage stress generated in the fabric in the warp direction thereof at the roll surface temperature, is preferably applied to the fabric in the warp direction thereof to effect the heat-setting under tension.

In this heat-setting, the woven fabric is shrunk to an extent corresponding to the dry heat shrinkage of the filament yarns under the application of a tension in all directions due to the tension applied in the warp direction, and contact friction between the warp yarns and the contact friction between the weft yarns. In this case, the generation of an excessively crimped structure can be prevented. Due to these phenomena, a moderate and even seam slippage resistance is created in the ground structure segment.

By carrying out the roll setting in at least two steps at a low temperature and at a high temperature, the filter cloth can be fully and evenly shrunk. In this two step roll setting, preferably the low temperature roll has a temperature of 130° to 170° C. and the high temperature roll has a temperature of 160° to 220° C. More preferably, the roll setting procedure is carried out by using a roll setting system in which the roll temperatures are raised in three steps from a first low temperature to a final high temperature.

In the production of the finally finished product (filter cloth), it is preferable that the scouring procedure cause the basis weight of the fabric to increase by 2 to 15%, more preferably 3 to 13% based on the basis weight of the gray fabric, and the heat setting procedure cause the basis weight of the fabric to increase by 8 to 40%, more preferably 10 to 35% based on that of the gray fabric.

Also, in this filter cloth, the heat setting preferably causes the ultimate elongation of the fabric to increase to a level of 20%/3 cm or more in both the warp and weft directions. If the ultimate elongation of the heat-set fabric is less than 20%/3 cm, the resultant air bag sometimes exhibits an unsatisfactory burst strength, and the ultimate elongation is more preferably 25%/3 cm or more, still more preferably 30%/3 cm or more.

The filter cloth is optionally subjected to a calendaring treatment. By the calendaring, the gas-permeability can be slightly reduced, and the fabric surface can be smoothed. This surface-smoothed fabric effectively protects an occupant from injury by facial abrasion. The calendaring can reduce the thickness of the fabric so as to enhance the compactness of the resultant air bag. The filter cloth of the present invention may be coated with a resin material. The resin material may be selected from silicone rubbers and chloroprene rubbers.

Where the synthetic filament yarns are polyester filament yarns, the polyester polymer for forming the filament yarns may be selected from, for example, polyethylene terephthalate, polybutylene terephthalate, polyhexylene terephthalate, polyethylene naphthalate, polybutylene naphthalate, and polyethylene-1,2-bis(phenoxy) ethane-4,4'-dicarboxylate. Also, copolymers of the above-mentioned compounds with polyethylene isophthalate, polybutylene terephthalate/naphthalate, and/or polybutylene terephthalate/decanedicarboxylate can be utilized. Among these polymers, polyethylene terephthalate is more preferable due to the fact that the mechanical characteristics and the fiber-forming property thereof are fully balanced with each other.

EXAMPLES

The filter cloth of the present invention will be further explained by the following specific examples.

In the examples, the measurements of the physical properties of the filaments and woven fabrics and the evaluation of the resultant air bags were carried out as follows.

(1) Ratio of largest width of filament yarns in double weave structure to that in single weave structure Photographs of a front surface and a cross-section of a woven fabric specimen were taken by an electron microscope. The photographing was repeated ten times on random front surface portions and random cross sections so that each photograph includes both the high gas-permeability weave structure segment and the ground weave structure segment. In each photograph, the largest widths of the filament yarns located in the above mentioned segments, and a ratio of the largest width of the filament yarns in the high gas permeability means structure segment to that in the ground means structure segment were calculated.

(2) Gas-permeability

The gas-permeability of a filter cloth specimen was measured by using a gas-permeability tester (trademark: FX3300, made by Textest Co.) having a 100 cm$^2$ orifice under a pressure of 0.5 inch of mercury (125 Pa). With respect to the woven fabric specimen having a width of 1.5 m and a length of 5 m, the gas-permeability thereof was measured in 50 random portions thereof, and an average of the measurement results were calculated. Also, the ratio of a highest value to a lowest value thereof was calculated.

(3) Seam slippage value

The seam slippage value of a filter cloth specimen was measured in accordance with Japanese Industrial Standard (JIS), L 1096, 6.21 Slippage Resistance, 6.21.1 beam Slipping Method. The sewing yarns used were nylon 66 filament yarns with a thickness of 1260 denier and the stretching load was 120 kgf. In the woven fabric having mock leno weave structure segments, both the seam slippage value on a line drawn between two adjacent mock leno weave structure segments, which value is substantially the largest seam slippage value), and the seam slippage value of the ground weave structure segment which is substantially the smallest seam slippage value, were measured.

In the woven fabric having double weave structure segments, both the seam slippage value on a line drawn between two double weave structure segments, which is substantially the largest seam slippage value) and the seam slippage value of the ground segment (which is substantially the smallest seam slippage value) were measured.

Each of the above-mentioned seam slippage measurements was carried out in both the warp and weft directions, and an average of all the results in the warp and weft directions of the different weave structure segments was calculated.

(4) Damage of seam of air bag by inflation thereof and fine particle-filtering property of air bag A 60 liter non-coated air bag for a motorcar driver's seat was prepared from a top cloth consisting of a high density woven fabric with a plain weave structure alone and a bottom cloth consisting of one of the filter cloth specimens. An air bag module was prepared by attaching an inflator (type 4, made by Morton International Co.) to the air bag. An inflation test was applied to the air bag module. After the inflation, the damage to the seam portions of the air bag was observed. Also, the filtering property of the air bag for fine particles contained in the inflation gas was visually evaluated from the degree of staining of the inside surface of the air bag filter cloth.

(5) Deflating property of air bag after inflation of air bag

The deflating behavior of the air bag after inflation thereof was observed and evaluated by using a high speed videoscope.

Example 1

The polyester filament yarns having the yarn count indicated in Table 1 were employed as warp and weft yarns for a woven fabric. These warp and weft yarns were nontwisted yarns and subjected to a weaving process using a water jet loom equipped with a dobby device to produce a filter cloth consisting of a ground plain weave structure segment and mock leno weave structure segments. The number of dents of a reed was 15 dents/in, and three warp yarns were fed into each dent of the reed. The resultant gray woven fabric had cover factors of 961 in the warp direction and 976 in the weft direction.

The gray fabric was scoured and then dried at a temperature of 110° C. for one minute in a metal surface contact, tension type roll system while applying a tension to the fabric in the warp direction thereof. Further in the above-mentioned system, the fabric was heat set in two steps, namely, at a metal roll surface temperature of 155° C. for one minute, and then at a metal roll surface temperature of 180° C. for 1.5 minutes. The heat-set woven fabric had a basis weight of 222 g/m$^2$.

The gas-permeability and seam slippage value of the woven fabric were measured. Then, a 60 liter air bag for a driver's seat was produced from the woven fabric.

In the preparation of the air bag, a top cloth consisting of a high density woven fabric with a plain weave structure alone was combined with a bottom cloth consisting of the above-mentioned woven fabric (filter cloth) by a double chain stitch seaming method.

The seam damage of the air bag upon being inflated and the deflating property of the air bag after the inflation were measured and evaluated. The results are all indicated in Table 1.

Examples 2 to 6 and Comparative Examples 1 to 3

In each of Examples 2 to 6 and Comparative Examples 1 to 3, a filter cloth having the weave structures as indicated in Tables 1 to 4 were prepared from the polyester filament yarns or nylon 66 filament yarns as indicated in Tables 1 to 4 by using a water jet loom equipped with a dobby device.

The resultant gray fabric was scoured and heat-set by the same procedures as in Example 1, to produce a filter cloth.

The physical properties of the filter cloth were measured. Then, the filter cloth was converted to a 60 liter air bag for driver's seat in the same manner as in Example 1. The performance of the air bag was measured. All the test results are shown in Tables 1 to 4.

TABLE 1

| | | Example No. Example | | | | | |
|---|---|---|---|---|---|---|---|
| Item | | 1 | | 2 | | 3 | |
| Yarns | Type | Polyester | | Polyester | | Polyester | |
| | Yarn thickness (denier) | 420 | | 420 | | 420 | |
| | Individual filament thickness (denier) | 1.7 | | 1.7 | | 1.7 | |
| | Filament number | 250 | | 250 | | 250 | |
| Gray woven fabric | Weave structure | Mock leno Plain | | Mock leno Plain | | Mock leno Plain | |
| | Pinhole-like openings | Formed | | Formed | | Formed | |
| | Twist multiplier | | | | | | |
| | Warp | 0 | | 0 | | 0 | |
| | Weft | 0 | | 0 | | 0 | |
| | Cover factor | | | | | | |
| | Warp | 961 | | 955 | | 961 | |
| | Weft | 971 | | 971 | | 976 | |
| Finished woven fabric | Pinhole-like openings | Formed | | Formed | | Formed | |
| | Basis weight (g/m²) | 224 | | 223 | | 222 | |
| | Proportion of each weave structure | 6.3 | 93.7 | 8.3 | 91.7 | 12.5 | 72.5 |
| | Yarn number of repeating unit warp/weft | 24/24 | | 24/18 | | 24/24 | |
| | Average gas permeability/ (ml/cm²/sec/125 Pa) | 0.87 | | 0.92 | | 1.30 | |
| | Highest gas-permeability/ lowest gas-permeability ratio | 1.15 | | 1.19 | | 1.14 | |
| | Seam slippage value (mm) | | | | | | |
| | Warp | 1.6 | 1.2 | 2.2 | 1.6 | 2.2 | 1.9 |
| | Weft | 1.7 | 1.0 | 2.4 | 1.6 | 2.8 | 2.0 |
| Air bag | Seam damage by gas inflation | None | | None | | None | |
| | Deflating property after inflation | Good | | Good | | Good | |
| General evaluation | | Good | | Good | | Good | |

TABLE 2

| | | Example No. Example | | | | | |
|---|---|---|---|---|---|---|---|
| Item | | 4 | | 5 | | 5 | |
| Yarns | Type | Polyester | | Polyester | | Nylon 66 | |
| | Yarn thickness (denier) | 420 | | 420 | | 420 | |
| | Individual filament thickness (denier) | 1.7 | | 1.7 | | 5.8 | |
| | Filament number | 250 | | 250 | | 72 | |
| Gray woven fabric | Weave structure | Mock leno Plain | | Mock leno Plain | | Mock leno Plain | |
| | Pinhole-like openings | Formed | | Formed | | Formed | |
| | Twist multiplier | | | | | | |
| | Warp | 0 | | 0 | | 0 | |
| | Weft | 0 | | 0 | | 0 | |
| | Cover factor | | | | | | |
| | Warp | 955 | | 961 | | 961 | |
| | Weft | 965 | | 976 | | 976 | |
| Finished woven fabric | Pinhole-like openings | Formed | | Formed | | Formed | |
| | Basis weight (g/m²) | 223 | | 222 | | 218 | |
| | Proportion of each weave structure | 16.6 | 83.4 | 25.0 | 75.0 | 25.0 | 75.0 |
| | Yarn number of repeating unit warp/weft | 12/18 | | 12/12 | | 12/12 | |
| | Average gas permeability/ (ml/cm²/sec/125 Pa) | 1.51 | | 2.06 | | 2.29 | |
| | Highest gas-permeability/ lowest gas-permeability ratio | 1.25 | | 1.34 | | 1.42 | |
| | Seam slippage value (mm) | | | | | | |
| | Warp | 2.7 | 2.5 | 3.0 | 2.5 | 3.1 | 2.4 |
| | Weft | 2.7 | 2.3 | 2.8 | 2.6 | 2.8 | 2.6 |
| Air bag | Seam damage by gas inflation | None | | None | | None | |
| | Deflating property after inflation | Good | | Good | | Good | |
| General evaluation | | Good | | Good | | Good | |

TABLE 3

| | | Example No. Example 7 |
|---|---|---|
| Item | | |
| Yarns | Type | Polyester |
| | Yarn thickness (denier) | 420 |
| | Individual filament thickness (denier) | 1.7 |
| | Filament number | 250 |
| Gray woven fabric | Weave structure | Mock leno Plain |
| | Pinhole-like openeings | Formed |
| | Twist multiplier | |
| | Warp | 0 |
| | Weft | 0 |

TABLE 3-continued

| Item | | Example No. Example 7 |
|---|---|---|
| | Cover factor | |
| Weft | Warp | 984 |
| | 984 | |
| Finished woven fabric | Pinhole-like openeings | Formed |
| | Basis weight (g/m²) | 225 |
| | Proportion of each weave structure | 12.5   87.5 |
| | Yarn number of repeating unit warp/weft | 36/36 |
| | Average gas permeability (ml/cm²/sec/125 Pa) | 1.62 |
| | Highest gas-permeability/ lowest gas-permeability ratio | 1.16 |
| | Seam slippage value (mm) | |
| | Warp | 2.6   2.2 |
| | Weft | 2.6   2.4 |
| Air bag | Seam damage by gas inflation | None |
| | Deflating property after inflation | Good |
| General evaluation | | Good |

TABLE 4

| Item | | Example No. Comparative Example | | |
|---|---|---|---|---|
| | | 1 | 2 | 3 |
| Yarns | Type | Polyester | Polyester | Polyester |
| | Yarn thickness (denier) | 500 | 420 | 420 |
| | Individual filament thickness (denier) | 2.0 | 1.7 | 1.7 |
| | Filament number | 250 | 250 | 250 |
| Gray woven fabric | Weave structure | Plain | Plain | Twill |
| | Pinhole-like openings | None | None | None |
| | Twist multiplier | | | |
| | Warp | 0 | 0 | 0 |
| | Weft | 0 | 0 | 0 |
| | Cover factor | | | |
| | Warp | 1040 | 914 | 1107 |
| | Weft | 1007 | 963 | 1188 |
| Finished woven fabric | Pinhole-like openings | None | None | None |
| | Basis weight (g/m²) | 210 | 181 | 234 |
| | Proportion of each weave structure | 100 | 100 | 100 |
| | Yarn number of repeating unit warp/weft | 2/2 | 2/2 | 4/4 |
| | Average gas permeability (ml/cm²/sec/125 Pa) | 0.98 | 1.87 | 3.94 |
| | Highest gas-permeability/ lowest gas-permeability ratio | 1.69 | 2.03 | 1.74 |
| | Seam slippage value (mm) | | | |
| | Warp | 7.7 | 10.0 | 8.9 |
| | Weft | 9.5 | 7.6 | 8.1 |
| Air bag | Seaqm damage by gas inflation | Damaged | Damaged | Damaged |
| | Deflating property after inflation | Bad | Bad | Bad |
| General evaluation | | Bad | Bad | Bad |

Example 8

The polyester filament yarns (made by Teijin Ltd.) as indicated in Table 5 were provided as warp and weft yarns. These filament yarns were non-twisted.

A gray woven fabric for a filter cloth having a ground single plain weave structure segment and double plain weave structure segments was produced from the polyester filament yarns by using a water jet loom equipped with a dobby device. The reed of the loom had a dent number of 15 dents/in and three warp yarns were fed to each dent.

The gray fabric was scoured and then dried at a temperature of 110° C. for one minute by using a metal surface-contact, tension type roll system, while applying a tension to the fabric in the warp direction thereof. Further, in this system, the woven fabric was heat-set in two steps, namely at a metal roll surface temperature of 155° C. for about one minute and then at a metal roll surface temperature of 190° C. for 1.5 minutes. The heat-set woven fabric had a basis weight of 240 g/m². The woven fabric was subjected to the gas-permeability test and the seam slippage value test. From this woven fabric, a 60 liter air bag for a driver's seat was produced. The performance of the air bag was measured.

The test results are all shown in Table 5.

Examples 9 and 10

In each of Examples 9 and 10, a woven fabric for filter cloth consisting of a ground single plain weave structure segment and double twill (twill derivative) weave structure segments was produced from the polyester filament yarns (made by Teijin Ltd.) or nylon 66 filament yarns (made by Akzo) as shown in Table 5.

The woven fabric was scoured and heat-set in the same manner as in Example 8 to provide a filter cloth. The physical properties of the filter cloth were measured. Then the filter cloth was converted to a 60 liter air bag for a driver's seat. The performance of the air bahias measured.

The test results are shown in Table 5.

Comparative Example 4

A gray woven fabric for a filter cloth having a twill weave structure alone was produced from polyester filament yarns (made by Teijin Ltd.) as shown in Table 5 in the same manner as in Example 8. The gray fabric was scoured and heat-set in the same manner as in Example 8.

The physical properties of the resultant filter cloth were measured. The filter cloth was converted to a 60 liter air bag for a driver's seat. The performance of the air bag was measured.

The test results are shown in Table 5.

TABLE 5

| | | Example 8 | | Example 9 | | Example 10 | | Comparative Example 4 |
|---|---|---|---|---|---|---|---|---|
| Yarns | Type | Polyester | | Polyester | | Nylon 66 | | Polyester |
| | Yarn thickness (denier) | 420 | | 420 | | 420 | | 420 |
| | Individual filament thickness (denier) | 1.7 | | 1.7 | | 5.8 | | 1.7 |
| | Filament number | 250 | | 250 | | 72 | | 250 |
| Finished woven fabric (Filter Cloth) | Weave structure | Double plain | Single plain (Ground) | Double twill | Single twill (Ground) | Double twill | Single twill (Ground) | Twill |
| | Twist multiplier | | | | | | | |
| | Warp | 0 | | 0 | | 0 | | 0 |
| | Weft | 0 | | 0 | | 0 | | 0 |
| | Cover factor | | | | | | | |
| | Warp | 1188 | | 1201 | | 1165 | | 1213 |
| | Weft | 1157 | | 1198 | | 1151 | | 1210 |
| | Basis weight (g/m$^2$) | 240 | | 250 | | 251 | | 253 |
| | Proportion (*)$_1$ | 2.1 | | 1.9 | | 1.4 | | — |
| | Average gas permeability (ml/cm$^2$/sec/125 Pa) | 1.52 | | 2.69 | | 3.07 | | 2.98 |
| | Highest gas-permeability/ lowest gas-permeability ratio | 1.20 | | 1.24 | | 1.22 | | 2.10 |
| | Seam slippage value (mm) | | | | | | | |
| | Warp | 0.7 | 0.6 | 1.0 | 0.7 | 1.1 | 1.0 | 7.8 |
| | Weft | 0.8 | 0.7 | 1.1 | 0.9 | 1.0 | 0.9 | 9.8 |
| Air bag | Seam damage by gas inflation | None | | None | | None | | Damaged |
| | Deflating property after inflation | Good | | Good | | Good | | Bad |
| General evaluation | | Good | | Good | | Good | | Bad |

Note:
(*)$_1$ Proportion in largest width of filament yarns in double weave structure to those in single weave structure

Industrial Applicability

The filter cloth of the present invention is useful for forming at least a portion of various types of air bags, for example, air bags for driver's seats, air bags for passenger's seats, air bags for rear seats and air bags for door side seats.

The filter cloth of the present invention is useful for producing various types of air bags. The air bags produced by using the filter cloth of the present invention do not require the formation of vent holes therein. For example, with respect to the air bags for driver's seats, the filter cloth of the present invention is useful for forming a top cloth located in a steering wheel, and with respect to the air bags for passenger's seats, the filter cloth of the present invention is useful for forming both side cloths. The filter cloth of the present invention can be used to form the entire face of the steering wheel side top cloth or a portion thereof. Also, where the filter cloth of the present invention is used for the two side cloths of the air bag, the entire two cloths of the air bag may be formed by the filter cloth or portions of the two cloths may be formed by the filter cloth. In these cases, the filter cloth used for the occupant side top cloth may be a coated cloth or non-coated cloth.

When the filter cloth is utilized to form the entire steering wheel side top cloth of the air bag for the driver's seat, preferably the gas-permeability of the filter cloth is adjusted to 0.6 to 2.0 ml/cm$^2$/sec/125 Pa. Also, where the filter cloth is utilized to form the entire two side cloths Of the air bag for passenger's seat, the gas-permeability of the filter cloth of the present invention is preferably adjusted to 2.0 to 7.0 ml/cm$^2$/sec/125 Pa.

The filter cloth of the present invention has a plurality of high gas-permeability structure segments evenly distributed in a dense ground structure segments and thus exhibits a substantially uniform gas-permeability throughout the cloth. Therefore, when air bag-forming pieces are cut from the filter cloth for preparing the air bag, the trimming of the cloth for cutting can be freely conducted and thus the entire filter cloth can be freely utilized in all directions thereof.

In the filter cloth of the present invention, though the high gas-permeability structure segments exhibit a high gas-permeability, the filter cloth exhibits a substantially uniform and excellent seam slippage resistance throughout the cloth, because the occupation area of the high gas-permeability segments is very small and the occupation area of the high density ground segment is large.

Particularly, where pinhole-like openings are formed in the high gas-permeability segments due to the specific weave structure thereof, the area of the openings is large compared with area of gaps formed between yarns in the conventional twill weave structure or plain weave structure, and thus the resultant air bag can effectively discharge a large amount of inflation gas at an instant upon being inflated. When the embodiment (1) of the filter cloth of the present invention is used, the resultant air bag exhibits an excellent deflating property after inflation. Therefore, the filter cloth can reduce the chest G and the head G (gravity acceleration) generated upon clashing, and cause the resultant air bag to exhibit a high safety for occupant.

The filter cloth of the present invention has the cutting freedom and the seam slippage resistance as mentioned below.

Since in the filter cloth of the present invention, the high gas-permeability structure segments, which can effectively filter fine particles in the inflation gas, are evenly straggled in a low gas-permeability, a high density ground segment having a single weave structure, this filter cloth is advantageous in that when cloth pieces for forming an air bag are cut from the filter cloth, the trimming for cutting can be carried out in random directions. Also, since the air bag produced from the filter cloth exhibits an excellent seam slippage resistance upon being inflated, no slippage and breakage of seams of the air bag due to inflation occurs and thus no scattering of fine particles in the inflation gas toward the outside happens. Also, no damaging of the air bag by a pressure of a high temperature gas locally concentrated to a slipped seam portion occurs. Therefore, the filter bag of the present invention can form air bags having a high safety.

When the filter cloth of the present invention is used, there is no limitation to trimming (layout) and cutting and thus the cloth can be entirely utilized. Also, the resultant air bag produced from the filter cloth has an excellent seam slippage resistance and is not damaged in the seams upon being inflated. Further, the filter cloth of the present invention can fully filter the fine particles in the inflation gas and prevent the escape of the fine particles.

We claim:

1. A filter cloth for air bags, comprising a woven fabric formed from synthetic fiber yarns, and characterized in that the woven fabric comprises
   (1) a ground weave structure segment having a single plain weave structure or a single twill weave structure; and
   (2) a plurality of high gas permeability weave structure segments formed in the ground weave structure segment at a substantially constant distribution density, exhibiting a higher air permeability than that of the ground weave structure segment, and having
      (A) a mock leno weave structure having pinhole-like openings,
      (B) a double plain weave structure; or
      (C) a double twill weave structure.

2. The filter cloth for air bags as claimed in claim 1, wherein the ground weave structure segment has a single plain weave structure and the high gas-permeability structure segments have a mock leno weave structure having pinhole-like openings.

3. The filter cloth for air bags as claimed in claim 1, wherein the plurality of high gas-permeability weave structure segments are distributed at substantially regular intervals in each of warp and weft directions thereof in the ground weave structure segment.

4. The filter cloth for air bags as claimed in claim 1, wherein each of the high gas-permeability weave segments having a mock leno weave structure is composed of at least one mock leno weave structure unit composed of 6 warp yarns and 6 weft yarns, and one pinhole-like opening is formed in each mock leno weave structure unit.

5. The filter cloth for air bags as claimed in claim 4, wherein the woven fabric is composed of repeating units each consisting of one mock leno weave structure segment and a portion of the ground weave structure segment located between the above-mentioned one mock leno weave structure segment and another mock leno weave structure segments adjacent thereto in both the warp and weft directions of the woven fabric, each of the repeating units being composed of 7 to 100 warp yarns and 7 to 100 weft yarns.

6. The filter cloth for air bags as claimed in claim 1, wherein each of the high gas-permeability mock leno weave structure segments is composed of 9 warp yarns and 9 weft yarns, and has four pinhole-like openings formed in each mock leno weave structure segment.

7. The filter cloth for air bags, as claimed in claim 6, wherein the woven fabric is composed of repeating units each consisting of one mock leno weave structure segment and a portion of the ground weave structure segment located between the above-mentioned one mock leno weave structure segment and another mock leno weave structure segments located adjacent thereto in both the warp and weft directions of the woven fabric, each of the repeating units being composed of 9 to 100 warp yarns and 9 to 100 weft yarns.

8. The filter cloth for air bags as claimed in claim 1, wherein the pinhole-like openings have a hole size of 50 to 500 $\mu$m.

9. The filter cloth for air bag as claimed in claim 1, wherein the pinhole-like openings are distributed at a distribution density of 1 to 150 openings/6.45 cm$^2$.

10. The filter cloth for air bags as claimed in claim 1, wherein each of the high gas-permeability double plain weave structure segments is composed of at least one double plain weave structure unit consisting of 8 warp yarns in the total yarn number of both the front and back side structures and 8 weft yarns in the total yarn number of both the front and back side structures.

11. The filter cloth for air bags as claimed in claim 10, wherein the woven fabric is composed of repeating units each consisting of one double plain weave structure segment and a portion of the ground weave structure segment located between the above-mentioned one double plain weave structure segment and another double plain weave structure segments adjacent thereto in both the warp and weft directions of the woven fabric, each of the repeating units being composed of 9 to 100 warp yarns and 9 to 100 weft yarns.

12. The filter cloth for air bags as claimed in claim 1, wherein each of the double plain weave structure segments has an area of 3 to 200 mm.

13. The filter cloth for air bags as claimed in claim 1, wherein the double plain weave structure segments are distributed in a density of 1 to 150 segments/6.45 cm$^2$.

14. The filter cloth for air bags as claimed in claim 1, wherein each of the high gas-permeability double twill weave structure segments is composed of at least one double twill weave structure unit consisting of 12 warp yarns in the total yarn number of both the front and back side structures and 12 weft yarns in the total yarn number of both the front and back side structures.

15. The filter cloth for air bags as claimed in claim 14, wherein the woven fabric is composed of repeating units each consisting of one double twill weave structure segment and a portion of the ground weave structure segment located between the above-mentioned one double twill weave structure segment and another double twill weave structure segments adjacent thereto in both the warp and weft directions of the woven fabric, each of the repeating units being composed of 13 to 100 yarns and 13 to 100 weft yarns.

16. The filter cloth for air bags as claimed in claim 1, wherein each of the double twill weave structure segments has an area of 3 to 200 mm$^2$.

17. The filter cloth for air bags as claimed in claim 1, wherein the double twill weave structure segments are distributed at a density of 1 to 150 segments/6.45 cm$^2$.

18. The filter cloth for air bags as claimed in claim 1, wherein the synthetic fiber yarns have a twist multiplier of 2500 or less.

19. The filter cloth for air bags as claimed in claim 1, wherein the synthetic fiber yarns are nontwisted synthetic filament yarns.

20. The filter cloth for air bags as claimed in claim 1, wherein the ground weave structure segment and the high gas-permeability structure segments are formed from the same synthetic fiber yarns as each other.

21. The filter cloth for air bags as claimed in claim 1, wherein the synthetic fiber yarns are polyester filament yarns each having an individual filament thickness of 0.5 to 3.0 denier and composed of 140 to filaments.

22. The filter cloth for air bags as claimed in claim 1, wherein the high gas-permeability structure segments have an air permeability of three times or less that of the ground weave structure segment.

23. The filter cloth for air bags as claimed in claim 1, wherein the high gas-permeability structure segments have a gas-permeability of 0.6 ml/cm$^2$/sec/125 Pa or more.

24. The filter cloth for air bags as claimed in claim 1, wherein the woven fabric has an average seam slippage value of 7 mm or less.

* * * * *